(12) United States Patent
Flick

(10) Patent No.: US 6,641,104 B2
(45) Date of Patent: *Nov. 4, 2003

(54) LONGITUDINAL ADJUSTMENT SYSTEM FOR SEATS

(75) Inventor: Joachim Flick, Hückeswagen (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/149,259

(22) PCT Filed: Aug. 16, 2001

(86) PCT No.: PCT/EP01/09416

§ 371 (c)(1), (2), (4) Date: Jun. 7, 2002

(87) PCT Pub. No.: WO02/30702

PCT Pub. Date: Apr. 18, 2002

(65) Prior Publication Data

US 2002/0179800 A1 Dec. 5, 2002

(30) Foreign Application Priority Data

Oct. 13, 2000 (DE) .......................................... 100 50 957

(51) Int. Cl.[7] .............................................. F16M 13/00
(52) U.S. Cl. .................................... 248/430; 297/344.1
(58) Field of Search ................................ 248/429, 430, 248/424; 297/341, 344.1

(56) References Cited

U.S. PATENT DOCUMENTS

| | | | | |
|---|---|---|---|---|
| 5,407,165 A | * | 4/1995 | Balocke | 248/429 |
| 5,732,923 A | * | 3/1998 | Tame | 248/430 |
| 5,806,825 A | | 9/1998 | Couasnon | 248/429 |
| 5,931,436 A | | 8/1999 | Rohee | 248/430 |
| 6,036,267 A | * | 3/2000 | Downey et al. | 297/341 |
| 6,098,946 A | * | 8/2000 | Sechet et al. | 248/424 |
| 6,113,051 A | | 9/2000 | Moradell et al. | 248/430 |
| 6,126,133 A | * | 10/2000 | Timon et al. | 248/429 |
| 6,227,596 B1 | * | 5/2001 | Foucault et al. | 296/65.13 |

FOREIGN PATENT DOCUMENTS

EP 0945301 9/1999

* cited by examiner

*Primary Examiner*—Leslie A. Braun
*Assistant Examiner*—A. Joseph Wujciak
(74) *Attorney, Agent, or Firm*—Friedrich Kueffner

(57) ABSTRACT

Longitudinal seat adjustment, especially for the seats of motor vehicles, with two pairs (10) of rails arranged a certain distance apart, each of which consists of two rails, namely, an upper rail belonging to the seat and a lower rail (12) belonging to the floor of the vehicle, and with at least one spring-loaded, movable, plate-shaped locking part (21), which is supported on the upper rail (11) and which, when in its locking position, prevents the upper rail (11) from moving in the lower rail (12). Here the lower rail (12) has tooth-like slots (14), whereas the upper rail (11) is provided with slit-like openings (10), and the locking part (21) carries tooth-like projections (15) along both of its two opposite long sides. According to the invention, one end of the locking part (21) acts on the upper rail (11), whereas the other end of the locking part (21) acts on the lower rail. One end of the locking part (21) contacts the lower rail (12), while the other end contacts the upper rail (11), where in each case a projection (15, 15') engages in the slit-like opening (16') and in the tooth-like slot (14).

2 Claims, 3 Drawing Sheets

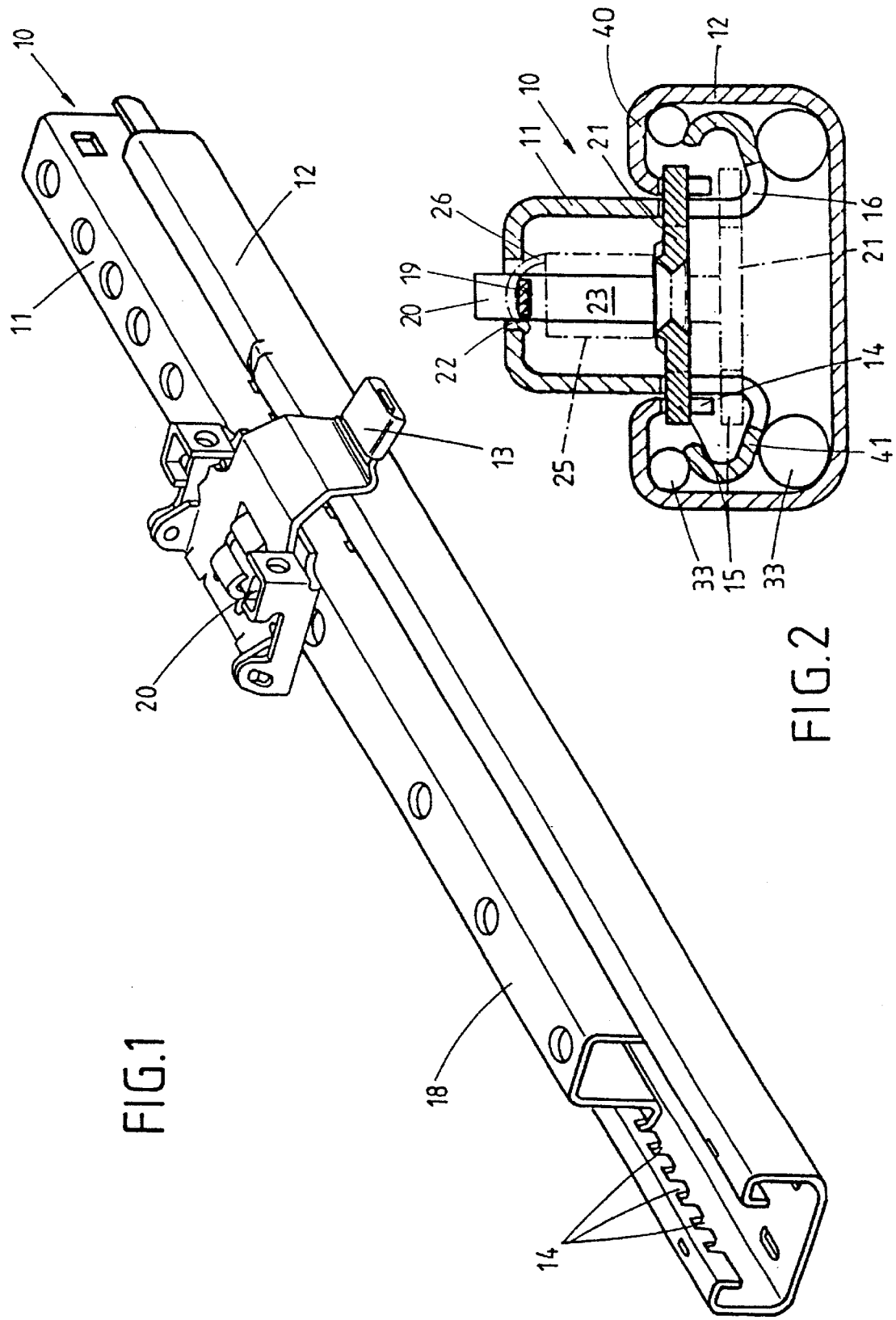

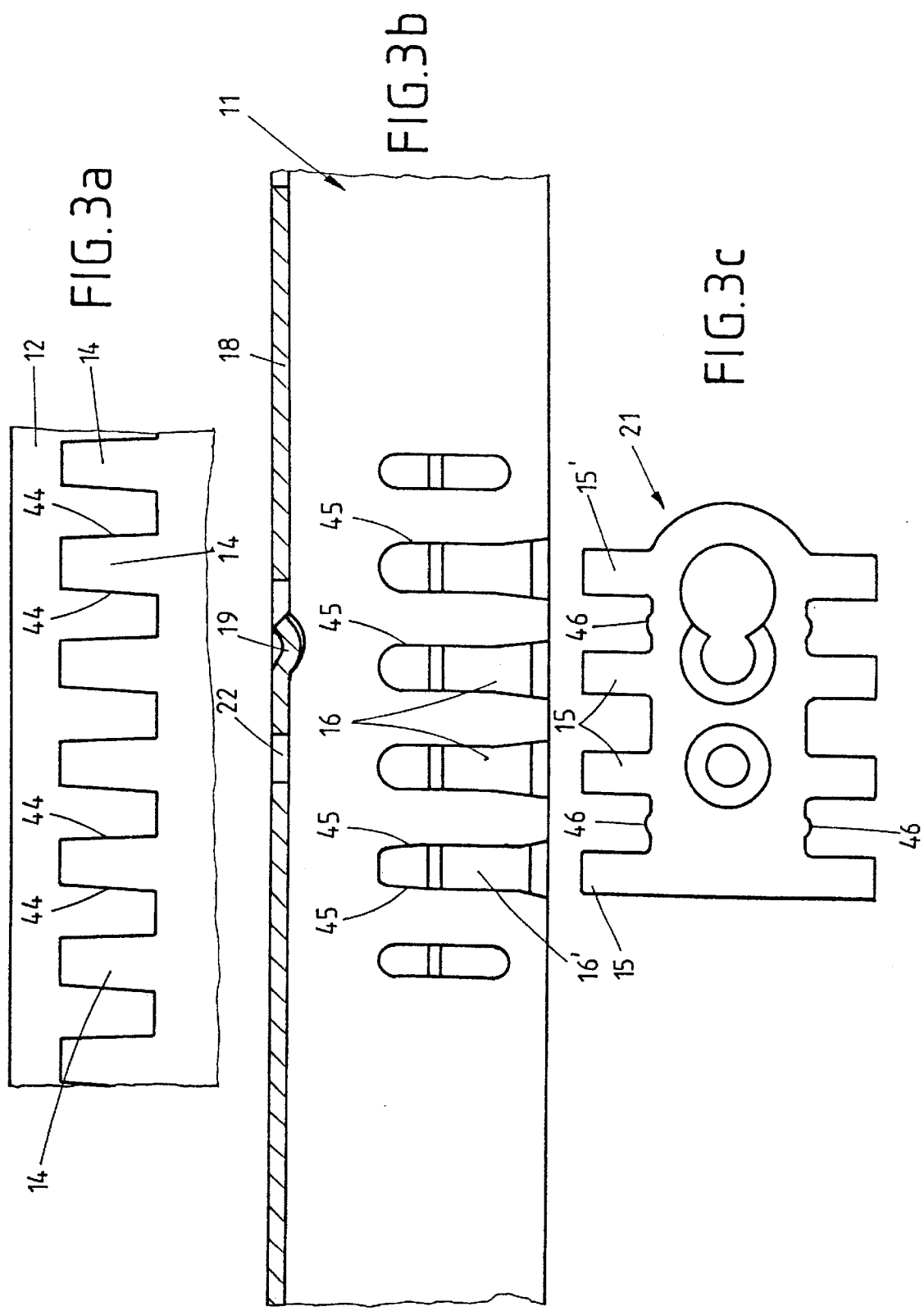

LONGITUDINAL ADJUSTMENT SYSTEM FOR SEATS

BACKGROUND OF THE INVENTION

The invention pertains to a longitudinal seat adjustment, especially for the seats of motor vehicles, with two pairs of rails, spaced a certain distance apart, each pair consisting of two rails, namely, an upper rail belonging to the seat and a lower rail belonging to the floor of the motor vehicle, and with at least one spring-loaded, movable, plate-shaped locking part, which is supported on the upper rail and which, when in the locking position, prevents the upper rail from moving in the lower rail, where the lower rail has tooth-like openings, where the upper rail is provided with slot-like openings, and where the locking part carries tooth-like projections on its two opposing long sides, which can be moved by a spring into both the slit-like openings and into the tooth-like slots to assume the locking position. A similar form of this type of longitudinal seat adjustment device is described in the unpublished Patent Application No. 100 41 605.5 of Aug. 24, 2000.

It is a disadvantage of the known designs that, because of the ability of the upper rail and lower rail to move with respect to each other when they are in the locked position, they are not held precisely without play. If sufficient load is exerted on them, they can be easily moved back and forth. In spite of the relatively small distance thus traveled, the play between the rail's continues to increase as a result of wear under the constant use and the constant load exerted on them by the user of the seat.

SUMMARY OF THE INVENTION

The task of the invention is therefore to design the longitudinal seat adjustment device of the type indicated above in such a way that the two rails, i.e., the lower rail and the upper rail, are held in place precisely with respect to each other when in the locked position and cannot be shifted. In addition, this holding-in-place without play is to be achieved with the smallest possible number of parts. This task is accomplished according to the invention in that the tooth-like projections of the locking part can be moved by a spring into the openings and slots in such a way that the first tooth-like projection contacts the edge area of a slot while another projection contacts the edge area of an opening. When in its locked position, the locking part thus holds the upper and lower rails without play, specifically as a result of an angular and/or vertical movement of the locking part. Because the position of the locking part is variable with respect to the rails, this movement allows two tooth-like projections to contact each rail. The locking part rests without play between the two rails.

In a special exemplary embodiment of the invention, the locking part supported on the upper rail is supported with freedom to tilt and/or to rotate, which ensures that the locking part, the upper rail, and the lower rail are held together without play; in this case, one end of the locking part contacts one of the rails, while the other end contacts the other rail. One projection engages in an opening, another one in a slot. The rails are thus no longer free to shift.

It is favorable for at least one tooth of the locking part, when executing a tilting motion, to contact the edge areas of one of the slit-like openings in the upper rail, while another tooth contacts the edge areas of a slot.

In a special exemplary embodiment of the invention, the openings and slots are designed with wedge-like shapes so that, upon engagement of the tooth-like projections, the spring, while rotating the locking part, can hold the edge areas without play between the two rails. It is advantageous for the first tooth-like projection of the locking part to be wider than the last tooth-like projection, and for an opening situated remotely from the first tooth of the locking part to be designed in the shape of a wedge, because, in an exemplary embodiment designed in this way, the edge areas of the slots and openings will be contacted when the locking part executes its tilting and/or rotating movement, and thus the rails will no longer have any freedom to move when in the locked position.

BRIEF DESCRIPTION OF THE DRAWINGS

An exemplary embodiment of the object of the invention is illustrated in the drawing:

FIG. 1 shows a perspective view of a pair of rails;

FIG. 2 shows a cross section through the pair of rails;

FIGS. 3a, 3b, and 3c show separate diagrams of the upper rail, the lower rail, and the locking part.

DESCRIPTION OF PREFERRED EMBODIMENTS

Figure 4:
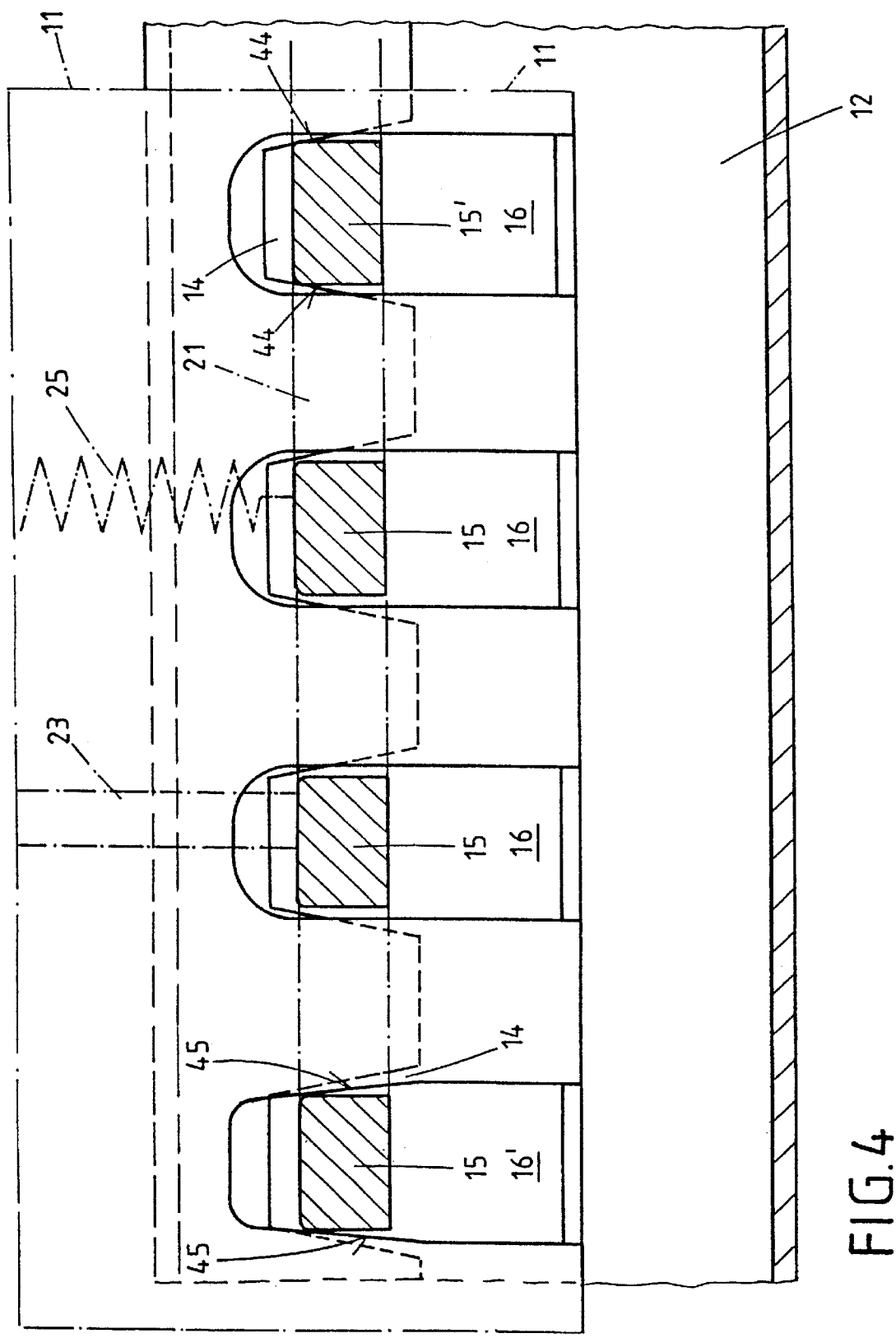
FIG. 4 shows the three parts in engagement with each other.

The longitudinal seat adjustment device according to the invention consists of two pairs 10 of rails, arranged a certain distance apart, each of which consists of an upper rail 11 and a lower rail 12. A pair of rails is shown in FIG. 1.

The upper rail 11 can shift its position in the lower rail by rolling over balls 33. The lower rail 12 can be fastened to the floor of a vehicle, whereas the upper rail 11 is attached to the frame of a seat. The upper and lower rails 11 and 12 both have a U-shaped profile. The free end of each sidepiece is bent over again and formed in such a way that the upper rail 11 acquires a second bent, U-shaped section 41, facing outward and up, whereas the lower rail acquires a second bent, U-shaped section 40 in the form of a U-shaped section 41, which faces inward and down. These two sections 40, 41 engage in each other, as can be seen, for example, in FIG. 2. To prevent the two rails 11, 12 from moving with respect to each other and thus to prevent the seat from shifting, the lower rail 12 is provided with tooth-like slots 14. Tooth-like projections 15, 15' of a locking part 21 engage in these slots 14. The locking part 21 is supported on the upper rail.

To prevent the upper rail 11 from moving in the lower rail 12, the tooth-like projections 15 rest in the tooth-like slots 14. At the same time, the tooth-like projections 15 also engage in the slot-like openings 16 in the upper rail. The tooth-like projections do not at first rest in the slots of the lower rail. The tooth-like projections 15 of the locking part 21 are pulled into the slots 14 of the upper rail 11 by the force of a spring 0.25 only after a guide pin 23 of the locking part 21 has been released by an actuating element 13. These slots are arranged in a continuous row along the lower rail 12.

In the locked position, the upper end 20 of the guide pin 23 projects out through an opening 22 in the center web 18 of the upper rail. In the released position, that is, in the position in which the rail 11 is free to slide in rail 12 and thus the seat can be shifted with respect to the floor, a certain length of the guide pin 23 moves into the interior of the rail 12.

As a result, the tooth-like projections 15 of the locking part 21 disengage from the tooth-like slots 14 in the lower rail.

In the exemplary embodiment illustrated here, a single locking plate 21, which carries the tooth-like projections 15 on its two opposite sides, is provided (see, for example, FIG. 3c). The width of the tooth-like slots, however, is such that its edge areas can be contacted by the tooth-like projections of the locking part. For this purpose, the slots 14 are designed with a wedge shape.

It should be explained here that the upper rail 11 has a bent section 19. The hook-shaped end 26 of a restoring spring 25 is hooked over this bent section. The other end of the spring is attached to the locking plate 21. As a result, the locking part is always pulled toward the upper rail 11, as long as this is not prevented by the webs between the tooth-like slots 14 in the lower rail. In FIG. 2, the released position of the locking part 21 is drawn in broken line; in this position, the teeth 15 are no longer engaged in the tooth-like slots 14. The end 20 of the pin-like guide 23 projects out from the upper rail.

In the extended position, i.e., in the locking position, the end 20 of the guide pin 23 projects out from the upper rail 11, and the tooth-like projections 15 of the locking plate 21 rest in the slots 14. In FIG. 3, the upper rail, the lower rail, and the locking part are shown on a larger scale. The lower rail 12 is represented only by the slots 14, which are slightly wedge-shaped. The center web 18 of the upper rail 11 is shown (compare FIG. 3b). This web carries the bent section 19 and the opening 22, through which the guide pin 23 projects. An actuating element 13 (FIG. 1) can push this pin down until the locking part disengages from the slots.

FIG. 3a shows that the tooth-like slots 14 of the lower rail 12 are conical. The slots 14 extending along the lower rail 12 are all of the same size and are spaced equally apart.

The upper rail 11 carries the slot-like openings 16 (FIG. 3b). Here the slot-like opening 16' tapers down at its upper end.

The openings for the insertion of the tooth-like projections expand outward with a wedge-like shape, as shown in FIG. 3b.

The tooth-like projection 15' is wider than the other tooth-like projections 15.

As can also be seen in FIG. 3c, bump-like areas 46 are provided between the projections. These bumps 46 serve to guide the locking part 21 in writing in the upper rail.

FIG. 3c shows a holder for the restoring spring and the holder for the guide pin. As can be seen in this figure, the locking part can execute a rotational movement around the bumps 46 or in the opening 16', so that the projection 15' can come into contact with the edge areas 44 of the slot 14.

FIG. 4 shows the engagement of the tooth-like projections 15 of the locking part 21.

The locking part is guided by the guide pin 23 as the pin moves through the opening 22, but there is a certain amount of play present here so that some freedom is provided for the movement of the locking part itself. In addition, the restoring spring 25 acts on the locking part, pulling it upward into the slit-like openings 16. As this is occurring, the somewhat wider tooth-like projection 15' contacts the edge areas 44 of the tooth-like slot 14 and arrives near the edge areas 45 of the opening 16 and thus holds the locking part firmly on the lower rail in one direction. At the same time, the locking part executes a tilting movement, because the penetration depth in the wedge-shaped opening 16' is different from that of the slot 15' in the slot 14.

The upper rail 11 is now held in place on the locking part, so that the two rails cannot be moved with respect to each other. It should be mentioned here that the projections in the lower row (FIG. 3c) also come into contact with the corresponding edge areas 44, 45 of the associated openings and slots.

As can be seen, the slit-like opening 16' is wedge-shaped at its upper end to ensure that the projection 15 is held securely and firmly.

As a result of the rotation and/or tilting of the locking plate, the tooth-like projections on both sides of the locking plate fit into the tooth-like slots and the openings in such a way that the rails are held in place without play.

As previously mentioned, the embodiments shown are only examples of how the invention can be realized. The invention is not limited to them. Instead, there are also many other possible modifications and applications. The important point is that the tooth-like projections are able to act with a tilting or rotational movement on the slit-like openings on both sides, whereas the wider projection contacts the edge areas on both sides. The bumps and/or the tilting movements, which compensate for manufacturing tolerances, allow this contact to occur without further effort. It should also be explained here that, under load, the other teeth of the locking part can also make contact with the edge areas of the slots or openings.

LIST OF REFERENCE NUMBERS

10 pair of rails
11 upper rail
12 lower rail
13 actuating element
14 tooth-like slot
15 tooth-like projection of 21
15' tooth like projection of 21
16 slit-like opening in 11
16' slit-like opening in 11
18 center web of 11
19 bent, projecting section of 18
20 free end of 23
21 locking part
22 opening in 18
23 guide pin
25 restoring spring
26 hook-shaped end of spring
33 ball
40 U-shaped section on 11
41 U-shaped section on 12
44 edge area of 14
45 edge area of 16
46 bump

What is claimed is:

1. A longitudinal seat adjustment for a seat of a motor vehicle, the seat adjustment comprising:

two pairs (10) of rails arranged a certain distance apart from one another, wherein the two pairs (10) are comprised of an upper rail (11) and a lower rail (12), respectively, wherein the upper rail (11) is adapted to be connected to the seat and the lower rail (12) is adapted to be connected to a floor of the vehicle;

wherein the two pairs (10) comprise at least one spring-loaded, movable, plate-shaped locking part (21), respectively, wherein the at least one locking part (21) is supported with freedom to tilt and/or to rotate on the upper rail (11), respectively;

wherein the at least one locking part (21), when in the locked position, prevents the upper rail (11) from moving relative to the lower rail (12), respectively;

wherein the lower rail (12) has tooth-shaped slots (14) and the upper rail (11) is provided with slit-shaped openings (16), respectively, wherein at least one of the slit-shaped openings and the tooth-shaped slots (14) are wedge-shaped;

wherein the at least one locking part (21) has two opposite long sides provided with tooth-shaped projections (15);

wherein the at least one locking part (21) has a spring (25), respectively;

wherein the tooth-shaped projections (15) are moved by the spring (25) into the slit-shaped openings (16) and the tooth-shaped slots (14) into a locking position such that a first one of the tooth-shaped projections (15'1) contacts an edge area (44) of a first one of the tooth-shaped slots (14) and a second one of the tooth-shaped projections (15) contacts an edge area (45) of a first one of the slit-shaped openings (16)

wherein the at least one locking part (21) executes an angular movement to reach the locked position, wherein in the locked position the upper and lower rails (11, 12) are held in a position without play.

2. The longitudinal seat adjustment according to claim 1, wherein the first tooth-shaped projection (15') of the locking part (21) is wider than a last one of the tooth-shaped projections (15), and wherein one of the slit-shaped openings (16') contacted by the last tooth-shaped projections (15) has a wedge shape.

* * * * *